No. 640,320. Patented Jan. 2, 1900.
A. T. PERKINS & F. C. WEBER.
SYSTEM FOR STERILIZING, DRYING, AND COOLING AIR.
(Application filed Dec. 5, 1896. Renewed Nov. 21, 1899.)
(No Model.) 3 Sheets—Sheet 1.
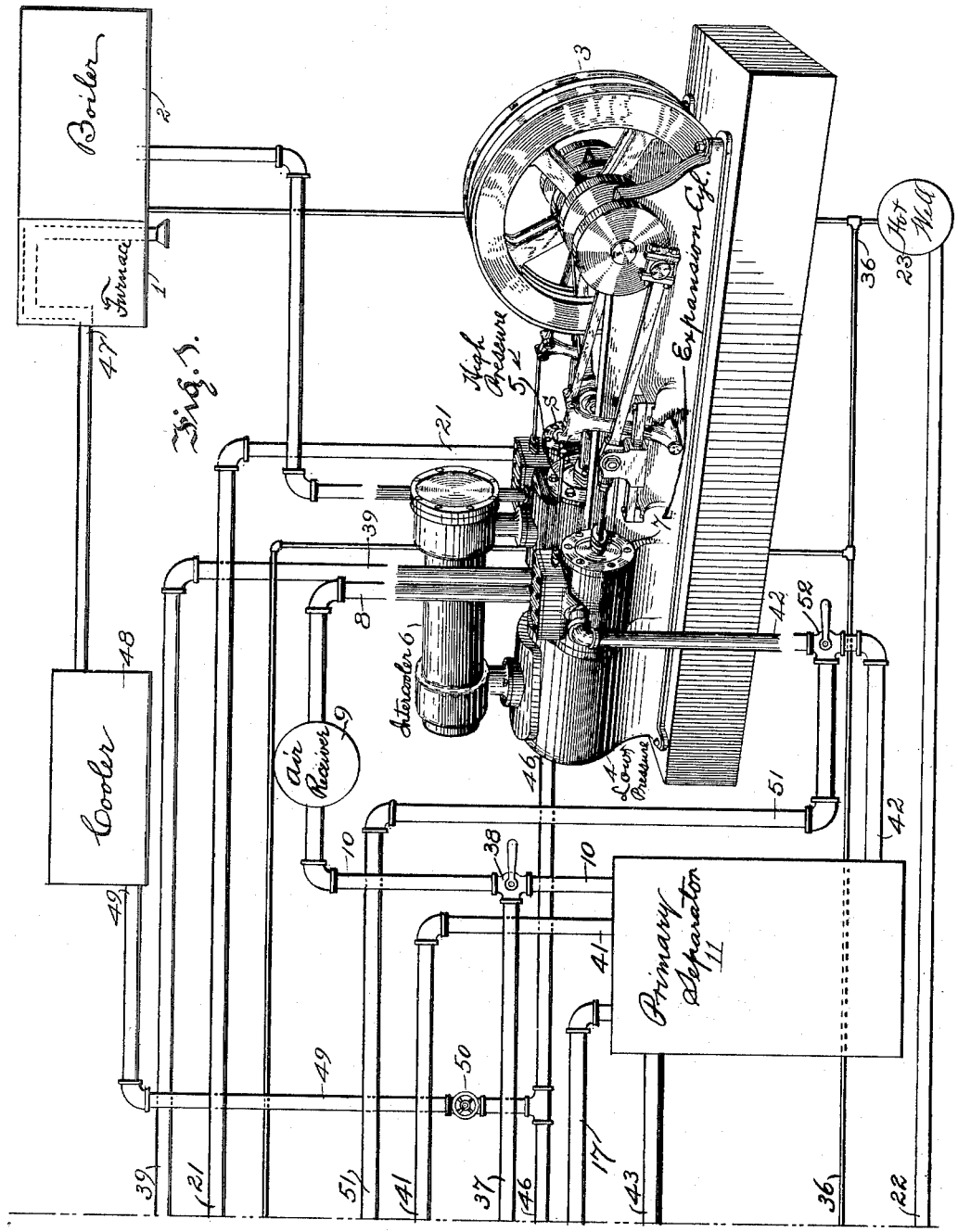
WITNESSES
INVENTORS
Alfred T. Perkins,
Frederick C. Weber,
by John Wedderburn
Attorney No. 640,320. Patented Jan. 2, 1900.
A. T. PERKINS & F. C. WEBER.
SYSTEM FOR STERILIZING, DRYING, AND COOLING AIR.
(Application filed Dec. 5, 1896. Renewed Nov. 21, 1899.)
(No Model.) 3 Sheets—Sheet 2.
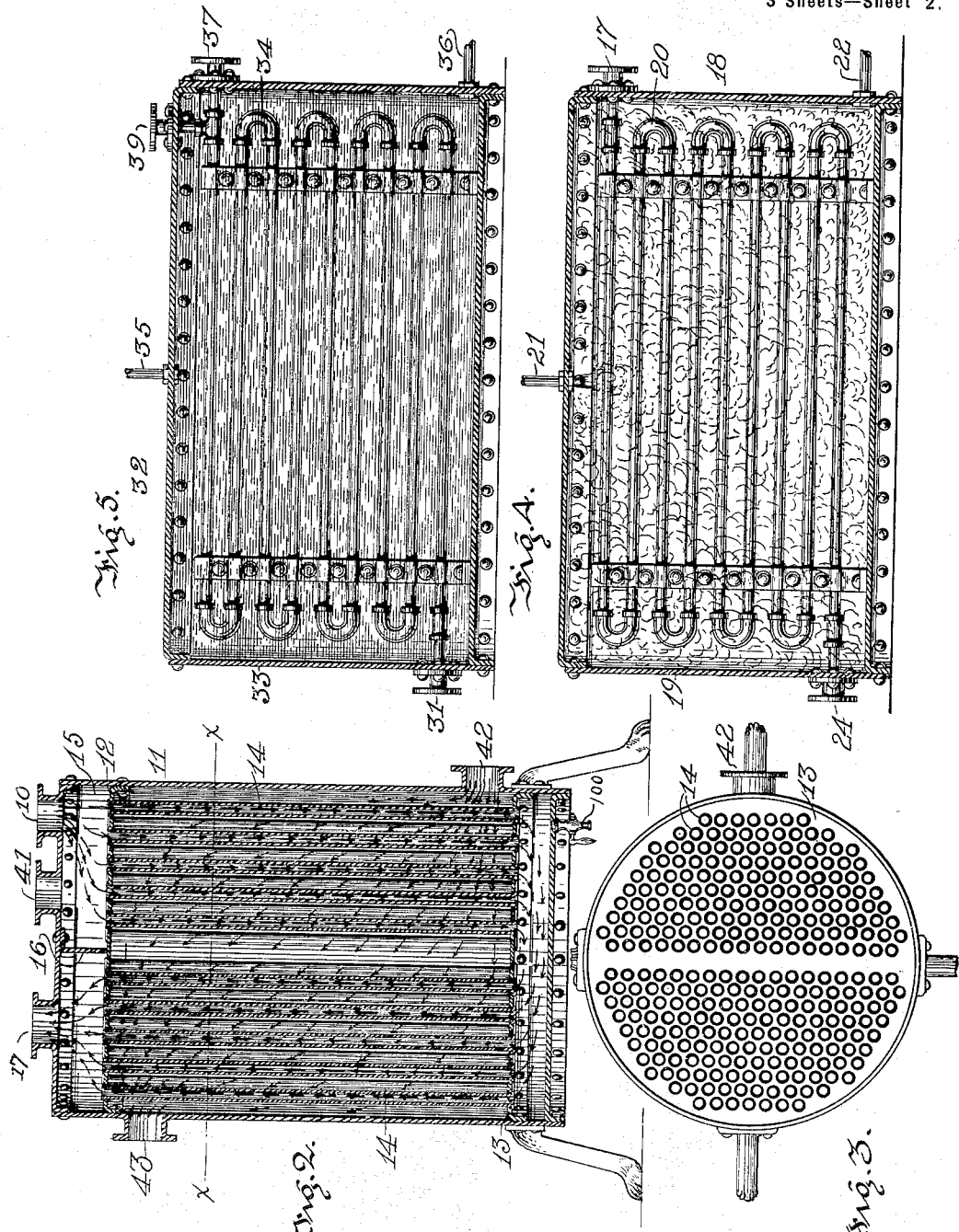
WITNESSES
INVENTORS
Alfred T. Perkins,
Frederick C. Weber,
by John Wedderburn
Attorney No. 640,320. Patented Jan. 2, 1900.
A. T. PERKINS & F. C. WEBER.
SYSTEM FOR STERILIZING, DRYING, AND COOLING AIR.
(Application filed Dec. 5, 1896. Renewed Nov. 21, 1899.)
(No Model.) 3 Sheets—Sheet 3.
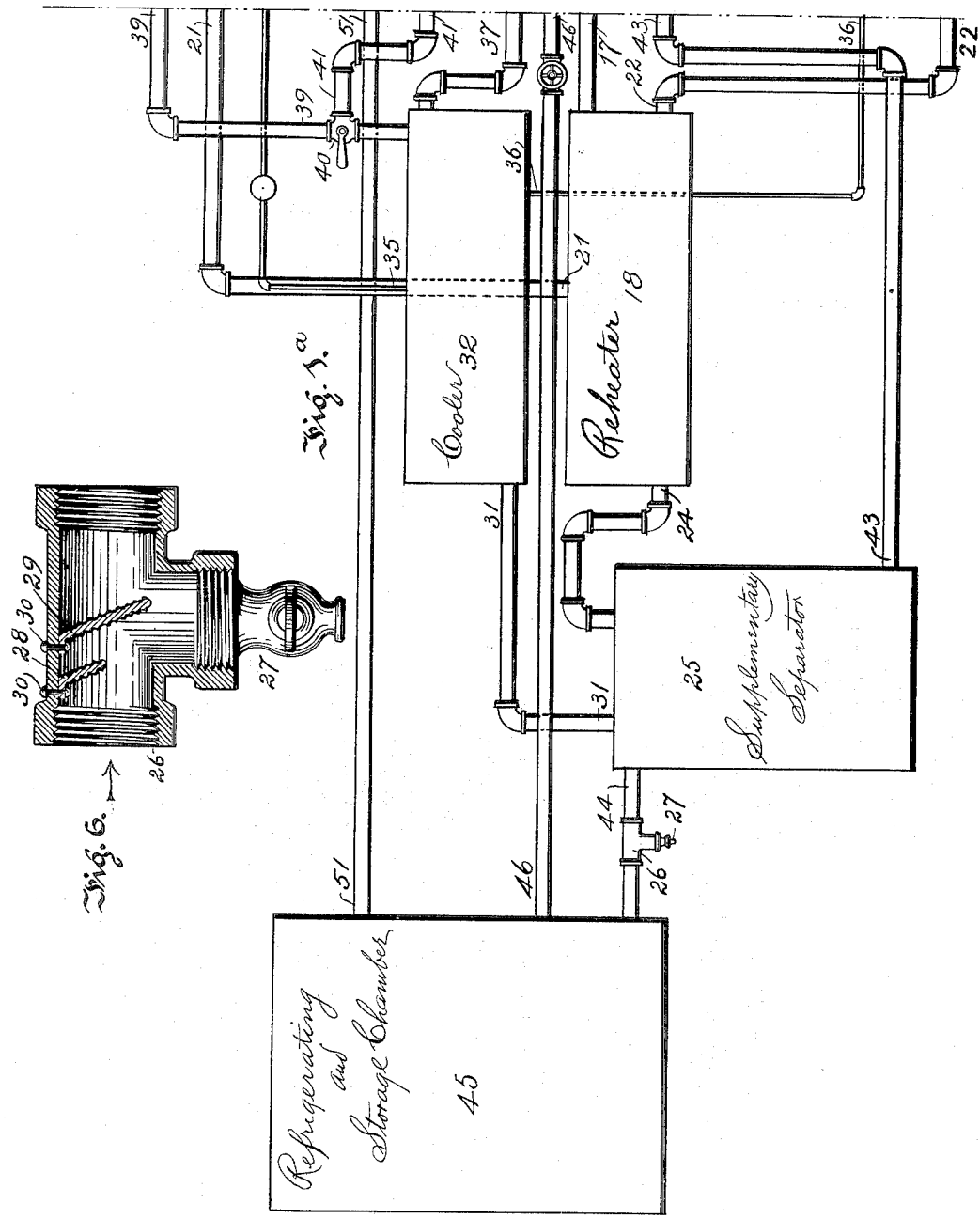

United States Patent Office.

ALFRED T. PERKINS, OF CHICAGO, ILLINOIS, AND FREDERICK C. WEBER, OF NEW YORK, N. Y.

SYSTEM FOR STERILIZING, DRYING, AND COOLING AIR.

SPECIFICATION forming part of Letters Patent No. 640,320, dated January 2, 1900.

Application filed December 5, 1896. Renewed November 21, 1899. Serial No. 737,822. (No model.)

*To all whom it may concern:*

Be it known that we, ALFRED T. PERKINS, residing at Chicago, in the county of Cook and State of Illinois, and FREDERICK C. WEBER, residing at New York, in the county of New York and State of New York, citizens of the United States, have invented certain new and useful Improvements in Systems for Sterilizing, Drying, and Cooling Air; and we do hereby declare the following to be a full, clear, and exact description of the invention, such as will enable others skilled in the art to which it appertains to make and use the same.

In an application filed by Alfred T. Perkins April 14, 1896, Serial No. 587,526, there is described a process for the conservation of fruit and other perishable products and apparatus for carrying out the same which utilizes instead of a closed chamber with moist air and a low temperature a condensed current of dry air at a normal temperature, the process being diametrically opposed to that of refrigeration. In another application, filed June 24, 1896, Serial No. 596,690, an improved construction of fruit-car for carrying out said process is shown and described, in which the surplus pressure of air in the ordinary Westinghouse brake system employed upon the car-service is utilized. In still a third application, filed October 13, 1896, Serial No. 608,767, a process and apparatus are described for drying air to be used in carrying out the process described in the first above-mentioned application, whereby the same is adapted to be used upon steamships and sailing vessels where the time required in transit from one point to another extends over a period of from fifteen to thirty days or more. These processes and the apparatus for carrying out the same have proved very effective; but it has been found that upon the large ship lines it is important to have mechanism which will not only serve for the conservation of fruit in a suitable compartment or receptacle without refrigeration, but will provide means whereby the temperature in the refrigerating-compartment may be lowered below the freezing-point for preserving meats and other like products and also for the manufacture of ice to be used on shipboard, if the same be desired.

The present invention therefore consists of an apparatus whereby the process described for the conservation of fruit at a normal temperature by dry air may be carried out and the same may be converted into a refrigerating apparatus for making ice.

The invention also consists in the details of construction and combinations of parts, which will be hereinafter more fully described and claimed.

In the drawings forming part of this specification, Figures 1 and 1$^a$ are complementary parts of a diagrammatic view illustrative of the different parts employed in carrying out our invention. Fig. 2 is a central longitudinal sectional view through the primary separator. Fig. 3 is a cross-section of the same on the line $x\ x$ of Fig. 2. Fig. 4 is a vertical sectional view of the reheater. Fig. 5 is a similar view of the cooler, and Fig. 6 is a detail sectional view of the mechanical separator.

Like reference letters and numerals indicate like parts in the different views.

In carrying out our invention we employ a furnace 1, a boiler 2, an engine 3, a low-pressure air-cylinder 4, a high-pressure air-cylinder 5, an intercooler 6, located between said high and low pressure air-cylinders, and an expander 7, all of ordinary form and construction. If desired, the high or low pressure cylinder 4 or 5 may be dispensed with, or we may employ a series of said cylinders with intercoolers located between them. Leading from one of the compression-cylinders is a pipe 8, which discharges into an air receiver or reservoir 9 of ordinary construction, from which leads a pipe 10 directly into a primary separator 11. The said separator is preferably cylindrical in form and is provided with two parallel horizontal septa 12 and 13, located at points a short distance from the upper and lower ends, respectively, of said separator. The said septa are perforated, as shown, and are connected by pipes 14 14, which are open at their upper and lower ends and form passages for the heated compressed air passing through said separator. The compartment 15, formed at the upper end of the separator 11 between the septum 12 and the top of said separator, is divided by a vertical partition 16, as clearly shown. Communicating with the compartment 15 through a pipe 17 is a reheater 18, which is made up of a casing 19 and a coil of pipe 20. The same is heated by exhaust-steam leading directly from the cylinder of the engine 3, entering through a pipe 21 and discharging through a pipe 22 into a hot-well 23. Leading from the coil 20 is a pipe 24, which communicates with a supplementary separator 25, constructed in all respects like the separator 11, being provided with perforated septa at points near the upper and lower ends thereof, pipes open at each end connecting said septa, and a partition dividing the compartment at the upper end of said supplementary separator into two parts. Leading from that side of the said compartment opposite the point of entrance of the pipe 24 is a pipe 31, which extends into the lower end of a cooler 32, which is made up of an outer casing 33 with a coil 34 on the inside thereof. The coil 34 is cooled by water in the compartment 33, which is supplied from any suitable source through a pipe 35 and is discharged through a pipe 36 into the hot-well 23. Leading from the pipe 10 to the upper part of the coil 34 is a pipe 37, and at the point of connection between said pipe 37 and the pipe 10 is located a three-way cock or valve 38 for changing the direction of flow of air from the receiver 9 to the separator 11 or to the cooler 32. Also leading from the coil 34 is a pipe 39, which discharges into the expansion-cylinder 7, heretofore referred to. In said pipe 39 is a three-way cock 40, provided for changing the direction of flow of the air from the cooler 32 from the pipe 39 to the pipe 41, leading into the upper end of the primary separator 11. From the expansion-cylinder 7 leads a pipe 42, which enters the primary separator 11 at a point between the septa 12 and 13 therein and discharges upon the outside of the pipes 14 14. Also leading from the separator 11, at a point near the upper end thereof, between the septa 12 and 13, is a pipe 43, which leads into the lower end of the supplementary separator 25 and discharges therefrom through a pipe 44 to a storage or refrigerating chamber 45. An exhaust-pipe 46 leads directly from the storage-chamber 45 to the low-pressure air-cylinder 4. Through the furnace 1 passes a pipe 47, which leads directly from the outside to a cooler 48 and thence through a pipe 49, provided with a suitable valve 50, into the pipe 46. Leading from the storage or refrigerating chamber 45 is a pipe 51, which is connected directly to the pipe 42 at a point adjacent to the expansion-cylinder 7, the said pipes being provided with a three-way valve or cock 52 at their point of connection. Suitable valves are provided in the different pipes described for the purpose of cutting off the flow of air therethrough when desired.

In operating our apparatus three separate and distinct circuits or routes for the air from the compression-cylinders and back are used. When it is desired to use the apparatus for the preservation of fruits in the storage-chamber 45, it is important to supply perfectly dry sterilized air thereto at a normal temperature of, say, 55° Fahrenheit. When this is done, the three-way cock or valve 38 is so turned that the pipe 37 is cut out of the circuit and the three-way cock 40 is turned so that the pipe 41 is out of the circuit. Air under high pressure and at a high degree of heat then passes from the compression-cylinders 4 and 5 through the pipe 8 into the receiver or reservoir 9 and thence through the pipe 10 into the separator 11. At the same time air from the expansion-cylinder 7 passes out through the pipe 42 into the lower part of said separator 11. The heated compressed air passes into one side of the compartment 15, thence down through the pipes 14, up again through the pipes on the opposite side, and out of the separator through the pipe 17 into the reheater 18. The cool air entering the separator on the outside of the pipes 14 from the expansion-cylinder 7 takes up the heat of the air in the pipes 14, precipitates the moisture contained therein, which moisture can be drawn off through the cock 100, and greatly reduces the temperature thereof. The dry air entering the coil 20 in the reheater 18 has its temperature again raised, and it is thence conducted through the pipe 24 into the supplementary separator 25. The said supplementary separator is cooled by the passage of the cold air from the separator 11 through the pipe 43 into the lower part thereof. Passing through the separator 25 the dry air admitted thereto is conducted through the pipe 31 into the cooler 32, where its temperature is still further reduced. It then passes through the pipe 39 back to the expansion-cylinder 7, where it enters the circuit through the pipe 42, separator 11, and pipe 43, which has heretofore been traced. Passing from the supplementary separator through the pipe 44 the air, which has been sterilized, dried, and cooled down to a normal temperature, is admitted into the storage-compartment 45. Here it is brought into contact with the fruit contained therein, and acting thereupon removes all the moisture upon the outside of said fruit, retarding the fermentation thereof, and is discharged therefrom through the pipe 46 into the low-pressure air-cylinder 4. In this passage through the pipe 46, however, it meets with a current of sterilized air which has passed through the furnace 1 in the pipe 47, had its temperature reduced by the cooler 48, and has been conducted thence through the pipe 49. The mixture of sterilized air and that which is partially impregnated with moisture from the storage-compartment 45 and also contains, perhaps, the germs of bacteria or mycelium from the fruit is resterilized by reason of the high degree of temperature to which it is raised in the compression-cylinders 4 and 5. A complete circuit is thereby formed which it has been found can be operated upon by an initial pressure of from fifteen to thirty pounds to the square inch gage-pressure. When it is desired to preserve meats in the chamber 45, the temperature therein must be lowered below the freezing-point. In order to do this, the three-way cock 38 is so turned that the lower end of the pipe 10 is thrown out of the circuit and the pipe 37 is thrown into the circuit. The cock 40 is also turned so that the coil 34 is out of communication with the pipe 39 and the pipe 41 is thrown into communication therewith. The three-way valve 52 is turned so as to permit the passage of the air from the expansion-chamber 7 through both of the pipes 42 and 51. The passage of the air from the compression-cylinders is then through the pipe 8, air-receiver 9, upper end of the pipe 10, cock 38, pipe 37, coil 34 in cooler 32, pipe 31, supplementary separator 25, pipe 24, reheater 18, and pipe 17 into the primary separator 11. Thence it passes out from the upper end of the separator 11 through the pipe 41 and pipe 39 to the expansion-cylinder 7. The cold expanded air is then discharged directly into the refrigerating-chamber 45 through the pipe 51 and is also discharged thereinto through the pipe 42, separator 11, pipe 43, separator 25, and pipe 44. Leaving the storage-compartment, it passes through pipe 46 back to the compression-cylinder 4, thereby completing the circuit. The air is admitted to the storage-compartment 45 in a dry and sterilized condition, but at a temperature which may be regulated to suit any conditions.

The air being discharged directly from the expansion-cylinder 7 through the pipe 51 enters storage-compartment at a much lower degree of temperature than it would if it were passed along its original course through the separators 11 and 25, where it would be heated by the air admitted to said separators through the pipe 10.

When it is desired to convert the apparatus into an ice-making machine, the storage-chamber 45 becomes the refrigerating-chamber, and the air therefrom may pass directly through pipe 46 into the compression-cylinder 4. The cock 50 is preferably closed, so as to cut off the supply of sterilized air, because when the apparatus is to be used for making ice it is not important that the air be sterilized or relieved of its moisture. The course of the air after having thus reached the compression-cylinder is substantially the same, as above described, as when this apparatus is used for the preservation of fruits. Therefore the air, having passed through the various pipes and chambers, is finally led through the pipe 39 to the expansion-cylinder 7. The cock 52 is turned so as to cut off the lower part of pipe 42, and the expanded air from the cylinder 7 then flows through upper part of pipe 42, through cock 52, and along pipe 51 directly into the refrigerating-chamber 45. Through the last-described circuit the air in the refrigerating-chamber may be reduced, if desired, to a temperature of 60° below zero. In the pipe 44 is located a mechanical separator. This is preferably formed of a T connection 26, inserted in the horizontal pipe 44 and having a drip-cock 27 at its lower end for drawing off moisture that may be deposited therein. Within the head of the T are located diaphragms 28 and 29, preferably corrugated, as seen in Fig. 6, secured at their upper ends, as by rivets 30, with their bodies inclined in the direction of the flow of the air passing through said head and with the diaphragm near the inlet end of less area than the other in order that the inflowing air will first strike said smaller diaphragm and leave part of its moisture thereon and then pass off this diaphragm onto or against the other or larger one and there deposit the balance of its moisture, said moisture and all impurities dripping thence into the cock 27, whence they may be drawn off from time to time.

Having now described our invention, what we claim as new, and desire to secure by Letters Patent, is—

1. The combination with an apparatus for sterilizing air, a compression-cylinder and an expansion-cylinder for the air, and a storage or preserving chamber; of a separator and a cooler, each consisting of coils or pipes in one circuit located within a casing which is in another circuit, and a circuit for the hot sterilized air from the compression-cylinder through the pipes of the separator and the coils of the cooler, thence to the expansion-cylinder, thence again through the separator and cooler but outside their pipes and coils, and thence into said chamber, as and for the purpose set forth.

2. In a refrigerating apparatus, the combination with means for sterilizing air, a compression-cylinder and an expansion-cylinder for the air, and a storage or preserving chamber; of two separators and a reheater between them, each consisting of coils or pipes in one circuit located within a casing which is in another circuit, and a circuit for the sterilized air from the compression-cylinder through the pipes of the separators and the coil-pipe of the reheater, thence to the expansion-cylinder, thence again through the separators and reheater but outside their said pipes and coils, and thence into said chamber, as and for the purpose set forth.

3. In a refrigerating apparatus, the combination with means for sterilizing and heating air, a compression-cylinder for the air, and a storage or preserving chamber; of two separators and a reheater between them, each consisting of coils or pipes in one circuit located within a casing which is in another circuit, a cooler, and a circuit for the hot sterilized air from the compression-cylinder through the pipes of the separators and the coils of the reheater and cooler, thence again through the separators, reheater, and cooler but outside their said pipes and coils, and finally into said chamber, as and for the purpose set forth.

4. In a refrigerating apparatus, the combination with compression and expansion cylinders for the air, a closed storage or preserving chamber, and an exhaust from said chamber to the compression-cylinder; of a cooler, a plurality of separators and a reheater between each two separators, each consisting of coils or pipes in one circuit located within a casing which is in another circuit, and a circuit for the air from the compression-cylinder first through the coil of the cooler, thence through the pipes of the separators and intermediately through the coil-pipe of the reheater, thence to the expansion-cylinder, thence again through the separators only but outside their pipes, and finally into said chamber, as and for the purpose set forth.

5. The combination with apparatus for sterilizing air, a compression-cylinder and an expansion-cylinder for the air, a conduit leading from said sterilizing apparatus to said compression-cylinder, and a storage or preserving compartment, of a moisture-separator, a pipe leading from said compression-cylinder to said separator, means for cooling said separator by cold expanded air from said expansion-cylinder, suitable connections between said separator and said chamber and between said chamber and said compression-cylinder whereby dry sterilized air may be supplied to said storage-chamber at a normal temperature, and means whereby air at a refrigerating temperature may be supplied thereto.

6. The combination with apparatus for sterilizing air, a compression-cylinder and an expansion-cylinder, for the air, and a storage or preserving compartment, of a primary separator, a pipe leading from said compression-cylinder to said primary separator for conveying the air under pressure at a high temperature thereto, a pipe leading from said expansion-cylinder to said primary separator, a reheater communicating with said primary separator, a supplementary separator communicating with said reheater, a cooler communicating with said supplementary separator, a pipe connecting said cooler with the pipe leading from said compression-cylinder to said primary separator, a three-way cock at the meeting-point of said pipes, a pipe also leading from said cooler to said expansion-cylinder, a pipe leading from said primary separator to said supplementary separator for the air from said expansion-cylinder, a pipe leading from said supplementary separator to said storage-chamber, a pipe leading from said storage-chamber to said compression-cylinder communicating with the pipe leading from said sterilizing apparatus, a pipe leading from said chamber to the pipe leading from said expansion-cylinder, and a three-way cock therein, substantially as and for the purpose described.

In testimony whereof we have signed this specification in the presence of subscribing witnesses.

ALFRED T. PERKINS.
FREDERICK C. WEBER.

Witnesses for Alfred T. Perkins:
HUBERT E. PAGE,
DANIEL E. UPTON.

Witnesses for Frederick C. Weber:
JESSE W. RENO,
G. HURRY.